US009350637B2

(12) United States Patent
Chaudhuri et al.

(10) Patent No.: US 9,350,637 B2
(45) Date of Patent: May 24, 2016

(54) SYSTEMS AND METHODS FOR GENERATING AND IMPLEMENTING MONITORING SOLUTIONS FOR A COMPUTING-BASED INFRASTRUCTURE

(71) Applicant: Tata Consultancy Services Limited, Mumbai (IN)

(72) Inventors: Subhrojyoti Roy Chaudhuri, Pune (IN); Jyothi Lolla, Pune (IN); Harrick Mayank Vin, Pune (IN); Swaminathan Natarajan, Pune (IN); Rahul Ramesh Kelkar, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 261 days.

(21) Appl. No.: 14/060,817

(22) Filed: Oct. 23, 2013

(65) Prior Publication Data

US 2014/0297841 A1    Oct. 2, 2014

(30) Foreign Application Priority Data

Mar. 28, 2013    (IN) .......................... 1231/MUM/2013

(51) Int. Cl.
*H04L 12/26* (2006.01)
*G06Q 10/00* (2012.01)
*H04L 12/24* (2006.01)

(52) U.S. Cl.
CPC ................ *H04L 43/10* (2013.01); *G06Q 10/00* (2013.01)

(58) Field of Classification Search
CPC . H04L 43/10; H04L 41/5003; H04L 41/0893; H04L 41/5019; H04L 41/06; H04L 41/08; H04L 41/0806; H04L 41/147; H04L 41/5025; H04L 41/0631; H04L 41/5032; H04L 41/5067; H04L 47/20; H04L 43/16; H04L 43/08; H04L 12/2472; G06Q 10/00; G06Q 10/20; G06F 11/3051; G06F 11/3055; G06F 11/30368; G06F 11/3072; G06F 11/3093; G06F 2201/81; G06F 2209/508; G06F 8/00; H04W 4/001
USPC ................. 709/224, 226, 223, 201, 203, 219; 705/7.12; 703/22
See application file for complete search history.

(56) References Cited

U.S. PATENT DOCUMENTS 6,701,342 B1 *  3/2004  Bartz et al. .................... 709/200
7,657,898 B2    2/2010  Sadiq
(Continued)

FOREIGN PATENT DOCUMENTS

CN    102169547 A    8/2011
CN    102199774 A    9/2011

OTHER PUBLICATIONS

"BMC Software", Wikipedia; retrieved Oct. 23, 2013; http://en.wikipedia.org/wiki/BMC_Software, (Oct. 3, 2013), 15 pgs.
(Continued)

*Primary Examiner* — Alina N Boutah
(74) *Attorney, Agent, or Firm* — Schwegman, Lundberg & Woessner, P.A.

(57) ABSTRACT

Systems and methods for generating and implementing monitoring solutions for a computing-based infrastructure are described. In one implementation, at least one monitoring objective is obtained, wherein the monitoring objectives are based on service related requirements associated with one or more computing systems within the computing-based infrastructure. Once the monitoring objectives are obtained, a plurality of monitoring elements are received, wherein the monitoring elements include attributes associated with the one or more systems. Based on the monitoring objectives and the monitoring elements, a monitoring solution is generated.

9 Claims, 2 Drawing Sheets

(56) References Cited

U.S. PATENT DOCUMENTS

| | | | |
|---|---|---|---|
| 8,316,305 | B2 | 11/2012 | Jaisinghani |
| 8,918,506 | B1* | 12/2014 | Clubb et al. ................... 709/226 |
| 2002/0095400 | A1* | 7/2002 | Johnson et al. .................... 707/1 |
| 2004/0153835 | A1* | 8/2004 | Song et al. ....................... 714/38 |
| 2006/0026010 | A1* | 2/2006 | van Moorsel et al. ............. 705/1 |
| 2006/0040648 | A1* | 2/2006 | Vikman et al. .............. 455/414.1 |
| 2006/0168194 | A1* | 7/2006 | Lake et al. .................... 709/224 |
| 2006/0294439 | A1 | 12/2006 | Rolia et al. |
| 2009/0161551 | A1* | 6/2009 | Danner .......................... 370/241 |
| 2010/0114531 | A1* | 5/2010 | Korn et al. .................... 702/186 |
| 2010/0153261 | A1* | 6/2010 | Tseng et al. ...................... 705/39 |
| 2010/0262467 | A1* | 10/2010 | Barnhill et al. ................. 705/10 |
| 2011/0138040 | A1* | 6/2011 | Kang et al. .................... 709/224 |
| 2011/0145657 | A1* | 6/2011 | Bishop ................ G06F 11/3495 714/47.1 |
| 2012/0254269 | A1* | 10/2012 | Carmichael ................... 707/827 |
| 2012/0297059 | A1 | 11/2012 | Bross |
| 2013/0024567 | A1* | 1/2013 | Roxburgh et al. ............ 709/224 |
| 2013/0132561 | A1* | 5/2013 | Pasala et al. ................. 709/224 |

OTHER PUBLICATIONS

"CA Nimsoft Monitor: Get unified coverage of the IT systems and cloud services that matter to your business", CA Technologies, retrieved Oct. 18, 2013, www.ca.com/us/products/detail/ca-nimsoft-monitor.aspx, (2013), 6 pgs.

"Tivoli Business Service Manager: Monitor business services and track them against business objectives", IBM Software; retrieved Oct. 18, 2013; www-03.ibm.com/software/products/us/en/tivoli-business-service-manager, (2013), 2 pgs.

* cited by examiner

SYSTEMS AND METHODS FOR GENERATING AND IMPLEMENTING MONITORING SOLUTIONS FOR A COMPUTING-BASED INFRASTRUCTURE

CLAIM OF PRIORITY

This application claims the benefit of priority of Indian Patent Application Serial No. 1231/MUM/2013, entitled "MONITORING SOLUTIONS FOR A COMPUTING-BASED INFRASTRUCTURE," filed on Mar. 28, 2013, the benefit of priority of which is claimed hereby, and which is incorporated by reference herein in its entirety.

FIELD OF INVENTION

The present subject matter relates, in general, to generate monitoring strategies, and particularly, but not exclusively, for generating and implementing monitoring solutions for a computing-based infrastructure.

BACKGROUND

Various organizations are presently supported by a computing-based infrastructure. Such an infrastructure includes a plurality of systems which operate to achieve one or more business functions of the organization. The systems within the computing-based infrastructure are regularly monitored. Through monitoring, a system administrator may understand running state of the system and detect any problem within the system. System monitoring therefore provides an accurate real-time assessment of the current state of the computing-based infrastructure. Such an overview can also be used for drilling into the entire network and determine the status even at a component level. In such a case, further assessment can be made to determine the impact such a component is likely to have on the network in the event of a component failure. Examples of such computing-based infrastructure include IT systems deployed within an siorganization, whose responsibilities may include ensuring that the systems within the computing-based infrastructure operate in a desired manner.

SUMMARY

This summary is provided to introduce concepts related to systems and methods for generating and implementing monitoring solutions for a computing-based infrastructure. This summary is not intended to identify essential features of the claimed subject matter nor is it intended for use in determining or limiting the scope of the claimed subject matter.

Systems and methods for generating and implementing monitoring solutions for a computing-based infrastructure are described. In one implementation, at least one monitoring objective is obtained, wherein the monitoring objectives are based on service related requirements associated with one or more computing systems within the computing-based infrastructure. Once the monitoring objectives are obtained, a plurality of monitoring elements is received, wherein the monitoring elements include attributes associated with the one or more systems. Based on the monitoring objectives and the monitoring elements, a monitoring solution is generated.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
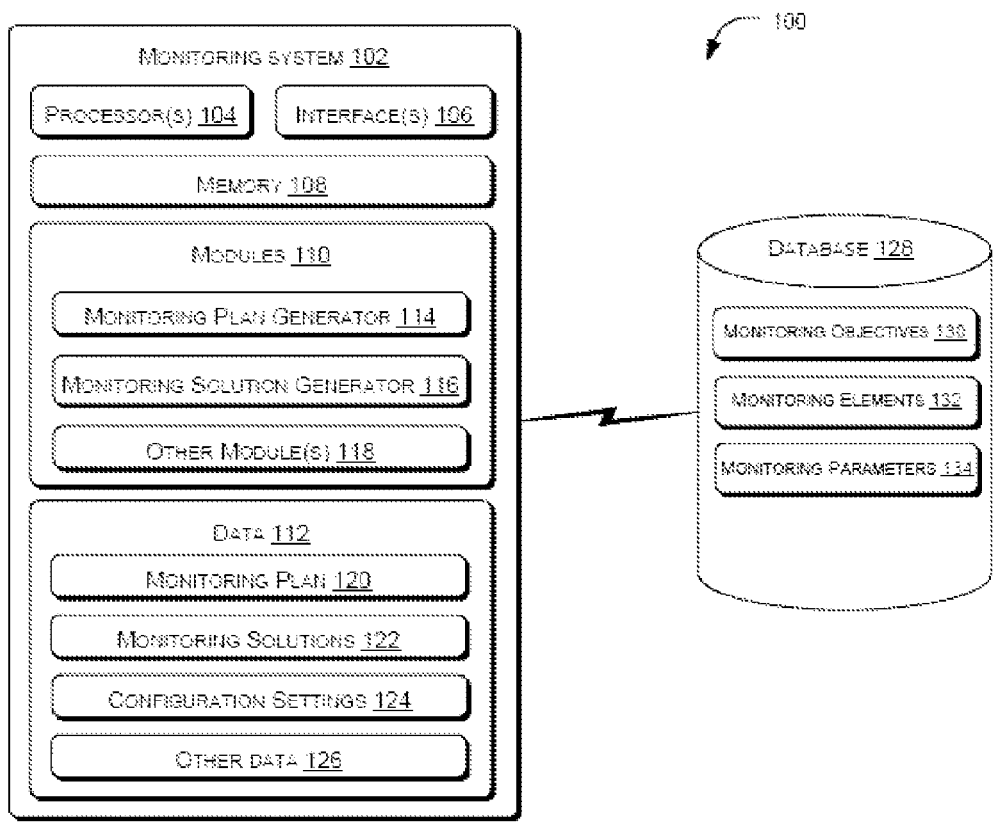
FIG. 1 schematically illustrates environment for generating and implementing monitoring solutions for a computing-based infrastructure, in accordance with an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

Systems and methods for generating and implementing monitoring solutions for a computing-based infrastructure are described herein. The systems and methods can be implemented in a variety of computing systems. Examples of such computing systems include, but are not restricted to, mainframe computers, workstations, personal computers, desktop computers, minicomputers, servers, multiprocessor systems, laptops, network servers, and the like.

Nowadays, organizations are growing rapidly. The businesses of such organizations are also becoming increasingly dependent on a variety of computing-based systems which form a part of a larger computing-based infrastructure, such as a computing-based infrastructure of an organization. The attainment of one or more business functions of such organizations consequently also becomes dependent on the efficiency of the computing-based infrastructure. The efficiency of the computing-based infrastructure may be determinative of performance, utilization of resources, and availability of resources of computing-based systems within the computing-based infrastructure. To this end, the current state of the infrastructure may be regularly monitored to ensure that the computing-based systems within the infrastructure continue to operate in a desired manner. In case any deviations from the expected operations are observed which may arise due to issues with the computing-based systems, appropriate actions can be implemented well in advance. In such a manner, any anomalies within the computing-based infrastructure can be detected and rectified efficiently.

As mentioned previously, the computing-based infrastructure can be monitored through various tools. Such tools continuously monitor various attributes associated with the systems within the computing-based infrastructure. These tools may rely on a repository of rules based on which the tools determine whether the components or systems within the computing-based infrastructure are operating as expected. Furthermore, other rules may also be employed to assess the performance and or the problems with the systems. Today, various monitoring tools are present in the market, such as IBM™ Tivoli®, BMC™ tool Atrium® and Bladelogic®, CA™ tools etc., for monitoring the IT systems. Examples of attributes that are associated with the computing-based infrastructure include, but are not limited to, disc utilization, network bandwidth utilization, etc.

Typically, such tools are not deployed as it is. Various factors might be taken into consideration before one or more tools can be selected for monitoring. For example, for a mail server within the infrastructure, a specific tool 'A' could be used, whereas for other systems, such as a print server or a file server, other appropriate tools can be used. Furthermore, before being deployed, such tools have to be individually and manually configured. During configuration, different settings and attributes can be provided depending on various considerations, such as the type of system which is to be monitored. As would be appreciated, for an entire computing-based infrastructure, it is quite possible that a variety of monitoring tools are utilized for monitoring systems related to different functions.

In such cases, the number of attributes to be monitored can be considerable. Furthermore, other modules may be implemented for collecting information based on which the status of the system, and in turn the state of the computing-based infrastructure, can be assessed. For monitoring, the modules are to be configured separately, either manually or with separate automation tools. However, as additional systems are deployed for extending the computing-based infrastructure, the additional modules have to be configured. In such cases, it thus happens that between the different configurations no conformity exists. As a result, for modules collecting information associated with similar attributes, a variation in the configurations is likely to exist. This in turn leads to inefficient working of the monitoring systems.

Furthermore, prior to deploying the appropriate tools, monitoring related planning can be done to obtain a monitoring solution prescribing appropriate tools and the configurations that are to be used along with the tools in question. Due to the different monitoring tools that are being used, an integrated and uniform basis for creating an efficient monitoring solution may be lacking. For example, planning for deploying monitoring tool 'A' for a system involve identifying scenario specific information like requirement for availability or selecting appropriate modules for collecting information, but may fail to assess the impact the monitoring tool may have on resources on data centers or might be agnostic of the various service related parameters.

Furthermore, it may also not take into account one or more best practices for affecting efficient monitoring of systems within the computing-based infrastructure. However, correlation between such best practices is most often not present which further inhibits obtaining an efficient monitoring solution.

Systems and methods for generating and implementing monitoring solutions for a computing-based infrastructure are described. In one implementation, generating and implementing monitoring solutions for a computing-based infrastructure is based on one or more monitoring objectives. The monitoring objectives include infrastructure or service related parameters which may be related to the system under consideration. For example, it may be specified that an objective for a requirement, such as down-time could include that a mail or application server the down-time is as minimal as possible. However, such a down-time might be longer for backup. Such requirements and/or objectives, in one implementation, can be specified in a Service Level Agreement (SLA). Other examples of monitoring objectives include interval when back up should be taken, workload, performance, etc.

Depending on the monitoring objectives, one or more monitoring elements are selected. The monitoring elements may relate to one or more attributes associated with the system for which a monitoring solution is to be generated. Depending on the monitoring objectives and the monitoring elements, a monitoring plan is further obtained. The monitoring plan in one implementation, prescribes the monitoring tool for monitoring the elements of the system under consideration.

Once the monitoring plan is obtained, the plan is is further translated to obtain a monitoring solution. The monitoring solution along with the prescribed tool also provides the various configuration settings which are to be used by the prescribed monitoring tool for monitoring the system within the computing-based infrastructure. The monitoring solution can be deployed within the computing-based infrastructure for monitoring the required systems present therein.

In another implementation, one or more configurable modules can also be used, which can be executed, to apply the configuration settings for the selected monitoring tools. The execution of the modules can be either manually initiated or can be automated. Once the configuration settings, as per the monitoring solution, are applied to the monitoring tools, the monitoring of the systems within the computing-based infrastructure is initiated.

In one implementation, systems for generating and implementing monitoring solutions for a computing-based infrastructure can be further provided with a dashboard which provides with real-time monitoring for the parameters associated with the system under monitoring.

As can be gathered from above, systems and methods for generating and implementing monitoring solutions for a computing-based infrastructure as described above, allow for an efficient mechanism for generating and implementing monitoring solutions for a computing-based infrastructure. For example, the monitoring solution generated is based on inputs which are related to service parameters, monitoring objectives, knowledge in relation to other monitoring techniques, etc. Such a monitoring solution, as would be understood, is contextually better suited based on the input parameters as provided above. Therefore, monitoring tools and appropriate monitoring strategies may be dependent on the system within the computing-based infrastructure under monitoring. For example, monitoring solutions and tools for monitoring mail servers would be different from solutions and tools for servers for maintaining backup data. In such a case, appropriate monitoring solutions for a computing-based infrastructure which are contextually associated with the appropriate systems are more efficient.

It should be noted that the description merely illustrates the principles of the present subject matter. It will thus be appreciated that various arrangements may also be employed that, although not explicitly described herein, embody the principles of the present subject matter and are included within its spirit and scope. Furthermore, all examples recited herein are principally intended expressly to be only for explanation purposes to aid the reader in understanding the principles of the present subject matter, and are to be construed as being without limitation to such specifically recited examples and conditions. Moreover, all statements herein reciting principles, aspects, and embodiments of the invention, as well as specific examples thereof, are intended to encompass equivalents thereof. The manner in which the methods shall be implemented onto various systems has been explained in details with respect to the FIGS. 1-2. While aspects of described systems and methods can be implemented in any number of different computing systems, transmission environments, and/or configurations, the embodiments are described in the context of the following system(s).

FIG. 1 illustrates a network environment 100 for generating and implementing monitoring solutions for a computing-based infrastructure, according to an embodiment of the present subject matter. In said embodiment, the network environment 100 includes a monitoring solution generation system 102 (hereinafter referred to as system 102) for generating and implementing monitoring solutions for a computing-based infrastructure. The system 102 may be implemented in a variety of computing systems, such as a laptop computer, a desktop computer, a notebook, a workstation, a mainframe computer, a server, a network server, and the like. In one implementation, the system 102 may be included within an existing information technology infrastructure or a data center of an organization. For example, the system 102 may be implemented within an existing information technology based infrastructure.

As would be appreciated by a person skilled in the art, any computing-based infrastructure includes a plurality of computing based systems. Such systems are typically associated with performing one or more dedicated functions within the computing-based infrastructure. Although not depicted in FIG. 1, the system 102 can be in communication with other systems within the computing-based infrastructure through one or more communication networks. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

The system 102 according to an implementation of the present subject matter includes a processor(s) 104, interface 106, and memory 108. The processor 104 may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in a memory, such as the memory 108.

The interfaces 106 may include a variety of software and hardware interfaces that allow the system 102 to interact with different applications and the peripheral hardware components of the computing device. The interfaces 106 may facilitate multiple communications within a wide variety of protocol types including, operating system to application communication, inter process communication, etc. Furthermore, the interface 106 also allows the system 102 to be communicatively coupled with one or more external databases.

The memory 108 may be coupled to the processor 104. The memory 108 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the system 102 may include module(s) 110 and data 112. The modules 110 and the data 112 may be coupled to the processors 104. The modules 110, amongst other things, include routines, programs, objects, components, data structures, etc., which perform particular tasks or implement particular abstract data types. The modules 110 may also be implemented as, signal processor(s), state machine(s), logic circuitries, and/or any other device or component that manipulate signals based on operational instructions.

In another aspect of the present subject matter, the modules 110 may be computer-readable instructions which, when executed by a processor/processing unit, perform any of the described functionalities. The machine-readable instructions may be stored on an electronic memory device, hard disk, optical disk or other machine-readable storage medium or non-transitory medium. In one implementation, the computer-readable instructions can be also be downloaded to a storage medium via a network connection.

In an implementation, the module(s) 110 includes monitoring plan generator 114, and a monitoring solution generator module 116, and other module(s) 118. The other module(s) 118 may include programs or coded instructions that supplement applications or functions performed by the system 102. In said implementation, the data 112 includes monitoring plan 120, monitoring solutions 122, configuration settings 124, and other data 126. The other data 126 amongst other things, may serve as a repository for storing data that is processed, received, or generated as a result of the execution of one or more modules in the module(s) 110. Although the data 112 is shown internal to the system 102, it may be understood that the data 112 can reside in an external repository, such as a database 128, which may be coupled to the system 102. The system 102 may communicate with the database 128 through the interface(s) 106 to obtain information from the data 112.

In one implementation, the database 128 further includes monitoring objectives 130, information in relation to monitoring elements 132 (hereinafter referred to monitoring elements 132), and monitoring parameters 134. In one implementation, these parameters can be stored within a database. Furthermore, as would be appreciated by a skilled person, the parameters can be stored either in a single database or can be stored in multiple databases, without deviating from the scope of the present subject matter. In one implementation, these parameters can be further stored in the data 112.

As mentioned earlier, the system 102 generates and implements monitoring solutions for a computing-based infrastructure. In operation, the monitoring plan generator 114 receives one or more monitoring objectives 130. The monitoring objectives 130 can be either pre-stored within a database, such as the database 128, or can be provided manually through user input. The monitoring objectives 130 further specify various infrastructure information or service related requirements, or objectives sought by the organization implementing the monitoring tools for the computing-based infrastructure. It should be noted that the service related requirements may differ from one system to another, owing to the different functionalities which might be implemented by such systems. For example, the service related requirements for a mail server are likely to differ from the service related requirements for an application server. Continuing with the example, a downtime with a mail server would perhaps be less than the downtime for the backup server.

In one implementation, the infrastructure related information can be specified as an XML file, as illustrated below in Illustration 1:

---
Illustration 1
---
```
<Server name="server1" ipaddress = "10.0.0.1" location = "trddc">
    <OS name="Linux" version="2002" id=""/>
    <DB instance_name= "database1" name="Oracle" version = "8i"
    address= "10.0.0.1:5431"/>
</Server>
```
---

As can be gathered from the illustration shows that a server server1 with IP address 10.0.0.1 is deployed in the data center that runs Linux as the operating systems and Oracle as the database. It would be appreciated that the above illustration is only one of the many possible implementations, and should not be construed to be limiting the scope of the claimed subject matter.

In one implementation, the service related requirements can be obtained from a Service-Level-Agreement (SLA) as might be present between an organization and the service provider. Furthermore, in another implementation, the monitoring objectives 130 can be a knowledge base of best monitoring practices for different types of monitoring tools. As would be appreciated, the knowledge base of the monitoring objectives 130 can be based on cumulative information related to monitoring that has been collected over a period of time. In one implementation, the SLA related requirements can also be specified in the form as provided in Illustration 2, as provided below, as per one implementation:

---
Illustration 2
---
```
<Customer name="ABC Internal" type = "Gold" BusinessArea = "IT"
service_type = "support, security, network"
Customer_specific_systems="email">
    <Working_hours from = "8:00 AM Mon" to = "06:00 PM Fri"/>
    <Weekend_hours from = "6:01 PM Fri" to = "07:59 AM Mon"/>
    <Business_critical_hours >
        <Day from = "11:00 AM Mon" to = "04:30 PM Fri"/>
        <Month from = "March" to = "November"/>
        <Month from = "01 Jan" to = "15 Feb"/>
    </Business_critical_hours>
    <Holidays>
        all holidays
    </Holidays>
</Customer>
```
---

Once the monitoring objectives 130 are obtained, the monitoring plan generator 114 further obtains the information 132 in relation to monitoring elements (hereinafter referred to as monitoring elements 132), and associated monitoring parameters 134. As mentioned previously, the computing-based infrastructure further includes a plurality of systems. Each of the system may be further characterized by one or more functional attributes. Such functional attributes, inter alia, may be indicative of a functional status of the system. For example, the status of the systems within the computing-based infrastructure can be determined based on attributes, i.e., monitoring elements 132, such as type of server being utilized, version number, CPU idle time, memory allocation, memory utilization, workload, etc. As would also be appreciated by a person skilled in the art, the monitoring elements 132 as herein described are only illustrative. Other types of the monitoring elements 132 can also be used without deviating from the scope of the present subject matter. In one implementation, one or more of the monitoring elements 132 can be further associated with a specific monitoring tool. For example, a monitoring tool A can be used for monitoring a mail server, but another monitoring tool B can be used for monitoring an application server.

Depending on the value of the monitoring elements 132 the functional status of the system under consideration can be assessed. In case the value of the monitoring elements 132 is greater or less than a predefined threshold value, it can be concluded that the system under consideration is not functioning in the desired manner. In one implementation, the values of the attributes indicative of the status of the systems under consideration, is working in an expected or unexpected manner, can be prescribed as monitoring parameters 134.

Based on the monitoring objectives 130, monitoring elements 132, and the monitoring parameters 134, the monitoring plan generator 114 generates a monitoring plan 120. The monitoring plan 120 captures various information as provided through the monitoring objectives 130, the monitoring elements 132, and the monitoring parameters 134. The monitoring plan 120 is prepared by populating one or more information specific fields based on the monitoring objectives 130, the monitoring elements 132, and the monitoring parameters 134. In one implementation, the monitoring plan 120 provides a mapping of the appropriate monitoring tool with the element which is to be monitored.

In some scenarios it is also possible that any one or more of monitoring objectives 130, the monitoring elements 132, and monitoring parameters 134 are not in a uniform format. In one implementation, the format of these parameters can be dependent on the monitoring tool which has been used for monitoring the system under consideration. The monitoring plan generator 114 on obtaining, scans or parses the monitoring objectives 130, the monitoring elements 132, and the monitoring parameters 134 to extract the appropriate information. For example, the monitoring plan generator 114 can scan through the XML file specifying various server and database parameters as specified in Illustration 1. In similar manner, the monitoring plan generator 114 can also parse through other similar XML files to determine one or more monitoring elements 132 and the associated monitoring parameters 134, as per one implementation.

Once the information is extracted the same is populated within the monitoring plan 120. The monitoring plan 120 thus obtained is presently in a non-tool specific format. In one implementation, the monitoring plan 120 can be represented using XML (eXtensible Markup Language). Once obtained as the monitoring plan 120, the information in relation to the monitoring objectives 130, the monitoring elements 132, and the monitoring parameters 134 is provided in a consistent format.

In one implementation, the monitoring plan generator 114 may utilize the monitoring objectives 130 specifying one or more best practices for a monitoring tool under question. For example, an XML file as illustrated below may specify various parameters for the monitoring tool under consideration:

---
Illustration 3
---
```
<Oracle>
    <Administration>
        <Check_alertlog Monitored="Yes" importance="Vital"
        SelfHealingDiagnosisScripts="" Type="L2"
        PollingFrequencyInSec="900"
        AmberThresholdSuggestedSeverityLevel=""
        CriticalThresholdLevel="Refer ORA Error EXCLUSION Sheet"
        CriticalThresholdTolerance=""
```

Illustration 3

```
        CriticalThresholdSuggestedSeverityLevel="3"/>
    </Administration>
...
    <Backup_and_Recovery>
        <Check_Backup Monitored="Yes" importance="Vital"
        SelfHealingDiagnosisScripts="" Type="L2"
        PollingFrequencyInSec="Completion of Job"
        AmberThresholdLevel=""
        AmberThresholdTolerance=""
        AmberThresholdSuggestedSeverityLevel=""
        CriticalThresholdLevel="Failure/Success"
        CriticalThresholdTolerance=""
        CriticalThresholdSuggestedSeverityLevel="3"/>
    </ Backup_and_Recovery>
</Oracle>
```

In order to generate the monitoring plan 120, the monitoring plan generator 114 may first generate a monitoring specification. In case the monitoring specification is in the form of an XML file, as per one implementation, the specification may include various tags which are initially empty. Based on the monitoring objectives 130, say as shown in Illustrations 1-3, the monitoring plan generator 114 populates the monitoring specification based on the values obtained from the monitoring elements 132 and the monitoring parameters 134, to obtain the monitoring plan 120.

Once the monitoring plan 120 is generated by the monitoring plan generator 114, the monitoring solution generator 116 obtains the monitoring plan 120 and generates a monitoring solution. In one implementation, the solution is stored as monitoring solutions 122. The monitoring solutions 122 generated by the monitoring solution generator 116 is used for implementing monitoring of one or more systems within the computing-based infrastructure. The monitoring solutions 122 provide suggestions and recommendations for the appropriate tools. For example, based on the values obtained from the monitoring objectives 130, monitoring elements 132 and the monitoring parameters 134, the monitoring plan generator 114 may compare the values with monitoring tool specific information to recommend or prescribe the monitoring tool. The monitoring solutions 122 can be used for providing a dashboard for providing information in relation to monitoring as implemented based on the generated monitoring solutions 122.

In one implementation, the monitoring solution generator 116 generates one or more configuration settings 124. The configuration settings 124 are such that they can be used for directly configuring the prescribed monitoring tools as specified by the monitoring solutions 122. In one implementation, the various parameters which can be specified by the configuration settings 124 may include, but are not limited to, host name, proxy host ID, user IP, DNS, port ID, SNMP port address, etc.

The configuration settings 124 can be generated from the monitoring solutions 122 through one or more plug-in modules. The plug-in module can be configured and implemented based on the monitoring tools that are being utilized for monitoring the systems within a computing-based infrastructure. In one implementation, the plug-in modules can be within other module(s) 118.

In another implementation, the monitoring solution generator 116 can generate one or more code based on the monitoring solutions 122. For example, the monitoring solution generator 116 generates the code based on the monitoring tool as recommended by the monitoring solutions 122. The code as generated can subsequently be executed by the monitoring solution generator 116 to implement one or more configuration settings 124 for configuring the monitoring tools. The execution of the modules can be either manually initiated or can be automated.

In one implementation, systems for generating and implementing monitoring solutions for a computing-based infrastructure can be further provided with a dashboard which provides with real-time monitoring for the parameters associated with the system under monitoring.

Figure 2:
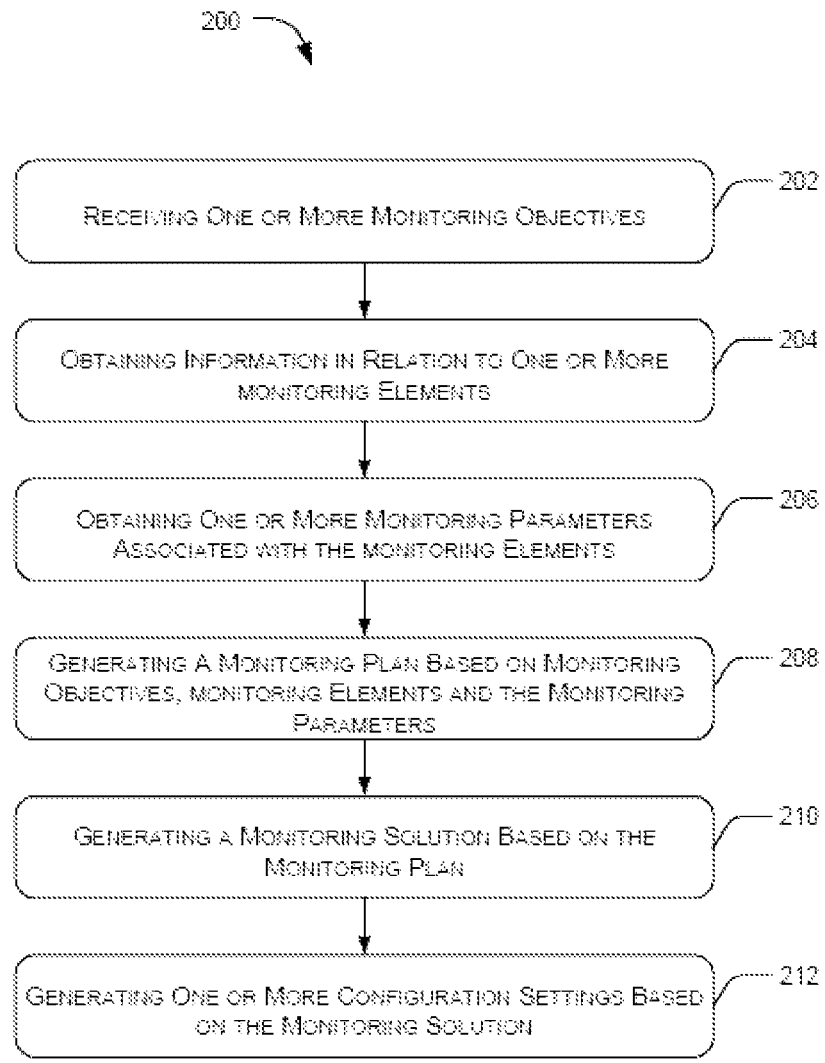
FIG. 2 illustrates a method generating and implementing monitoring solutions for a computing-based infrastructure, in accordance with an embodiment of the present subject matter.

FIG. 2 illustrates a method for generating and implementing monitoring solutions for a computing-based infrastructure, in accordance with an embodiment of the present subject matter. The order in which the method 200 is described is not intended to be construed as a limitation, and any number of the described method blocks can be combined in any order to implement the method, or any alternative methods. Additionally, individual blocks may be deleted from the method without departing from the spirit and scope of the subject matter described herein. Furthermore, the method can be implemented in any suitable hardware, software, firmware, or combination thereof.

The methods may be described in the general context of computer executable instructions. Generally, computer executable instructions can include routines, programs, objects, components, data structures, procedures, modules, functions, etc., that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

A person skilled in the art will readily recognize that steps of the methods can be performed by programmed computers and communication devices. Herein, some embodiments are also intended to cover program storage devices, for example, digital data storage media, which are machine or computer readable and encode machine-executable or computer-executable programs of instructions, where said instructions perform some or all of the steps of the described methods. The program storage devices may be, for example, digital memories, magnetic storage media, such as a magnetic disks and magnetic tapes, hard drives, or optically readable digital data storage media. The embodiments are also intended to cover both communication network and communication devices configured to perform said steps of the exemplary methods.

Referring to the FIG. 2, at block 202, one or more monitoring objectives are received. In one implementation, a monitoring plan generator 114 within the system 102 receives one or more monitoring objectives 130. The monitoring objectives 130 further specify various high level objectives or service related requirements sought by the organization implementing the monitoring tools for the computing-based infrastructure. For example, the service related requirements such as memory allocation for a mail server and an application server would be different. In one implementation, the monitoring objectives 130 can be determined based on a Service-Level-Agreement (SLA).

At block 204, information in relation to one or more monitoring elements is obtained. For example, the monitoring plan generator 114 on obtaining the monitoring objectives 130 receives the monitoring elements 132. As explained previously, each of the systems for which a monitoring plan is required, is characterized by one or more attributes or monitoring elements 132. Examples of such monitoring elements 132 include, but are not limited to, CPU idle time, memory allocation, memory utilization, workload, etc. In one implementation, the monitoring elements 132 can be utilized for assessing the functional state of the systems.

At block 206, monitoring parameters associated with the obtained monitoring elements, are obtained. For example, one or more monitoring parameters 134 associated with the monitoring elements 132 are obtained. In case the monitoring parameters 134 is greater or less than a predefined threshold value, it can be concluded that the system under consideration is not functioning in the desired manner.

At block 208, based on the monitoring objectives, monitoring elements and the monitoring parameters, a monitoring plan is generated. For example, the monitoring solution generator 116 generates a monitoring plan 120. In one implementation, the monitoring plan 120 is prepared by populating one or more information specific fields based on the monitoring objectives 130, the monitoring elements 132, and the monitoring parameters 134. In another implementation, the monitoring plan 120 is in an XML format.

At block 210, a monitoring solution is generated based on the monitoring plan. For example, the monitoring solution generator 116 obtains the monitoring plan 120 and generates a monitoring solution 122. The monitoring solutions 122 generated by the monitoring solution generator 116 is used for implementing monitoring of one or more systems within the computing-based infrastructure. The monitoring solutions 122 provide suggestions and recommendations for selecting the appropriate tools.

At block 212, one or more configuration settings are generated. The generated configuration settings can be applied for the appropriate monitoring tools to implement monitoring as per the generated monitoring solution. For example, the monitoring solution generator 116 generates one or more configuration settings 124. The configuration settings 124 are such that they can be used for directly configuring the monitoring tools as specified by the monitoring solutions 122. The configuration settings 124 can be generated from the monitoring solutions 122 through one or more plug-in modules. Once applied, the systems within the computing-based infrastructure are monitored based on the monitoring solutions 122.

Although embodiments for methods and systems for generating and implementing monitoring solutions for a computing-based infrastructure have been described in a language specific to structural features and/or methods, it is to be understood that the present subject matter is not necessarily limited to the specific features or methods described. Rather, the specific features and methods are disclosed as exemplary embodiments for the generating and implementing monitoring solutions for a computing-based infrastructure.

We claim:

1. A system for generating monitoring solutions for a computing-based infrastructure, the system comprising:
   a processor device;
   a monitoring plan generator coupled to the processor device, wherein the monitoring plan generator is configured to, receive a plurality of monitoring objectives, wherein the monitoring objectives are based at least on one of infrastructure information and service related requirements associated with one or more computing system systems within the computing-based infrastructure;
   receive a plurality of monitoring elements, wherein the monitoring elements include attributes associated with functional status of the one or more systems; and
   assess values of each of the attributes of the monitoring elements with a predefined threshold value to determine whether the one or more systems are operating in an expected manner; and
   generate a monitoring plan based on the plurality of monitoring objectives and the plurality of monitoring elements and based on the assessment of values of each of the attributes, wherein the generated monitoring plan is in the form of monitoring specification specifying a plurality of tags populated based on the plurality of monitoring objectives and the plurality of monitoring elements; and
   a monitoring solution generator coupled to the processor, the monitoring solution generator configured to generate a monitoring solution based on the monitoring plan, and generate configurable settings for configuring at least one monitoring tool as specified by the monitoring solution.

2. The system as claimed in claim 1, wherein the monitoring objectives are obtained from one of service level agreement and a knowledge base including information related to prior monitoring implementations.

3. The system as claimed in claim 1, wherein the monitoring plan provides a mapping between the monitoring elements and a configurable monitoring tool to be used for monitoring the monitoring elements.

4. The system as claimed in claim 1, wherein the monitoring solution generator further generates an executable code for implementing the configuration settings.

5. A computer implemented method for generating and implementing monitoring solutions for a computing-based infrastructure having one or more systems, the method comprising:
   receiving a plurality of monitoring objectives, wherein the monitoring objectives are based on at least one of infrastructure information and service related requirements associated with one or more systems within the computing-based infrastructure;
   receiving a plurality of monitoring elements, wherein the monitoring elements include attributes associated with functional status of the one or more systems;
   assessing values of each of the attributes of the monitoring elements with a predefined threshold value to determine whether the one or more systems are operating in an expected manner;
   generating a monitoring plan based on the plurality of monitoring objectives and the plurality of monitoring elements and based on the assessment of values of each of the attributes, wherein the generated monitoring plan is in the form of monitoring specification specifying a plurality of tags populated based on the plurality of monitoring objectives and the plurality of monitoring elements;
   generating a monitoring solution based on the monitoring plan, the monitoring objectives and the monitoring elements; and
   implementing the monitoring solution for the one or more systems by generating configurable settings for configuring at least one monitoring tool as specified by the monitoring solution.

6. The method as claimed in claim 5, wherein the at least one monitoring objective is obtained through user input.

7. The method as claimed in claim 5, wherein
the monitoring plan prescribes at least a monitoring tool for monitoring one or more of the plurality of the monitoring elements.

8. The method as claimed in claim 7, wherein the generating the monitoring solution further comprises:

translating the monitoring plan to generate the monitoring solution; and generating, based on the monitoring solution, at least one executable code for execution by the prescribed monitoring tool.

9. A non-transitory computer-readable medium having thereupon computer-executable instructions which when executed by a processor, implements the method comprising:

obtaining a plurality of monitoring objective, wherein the monitoring objectives are based at least on one of infrastructure information and service related requirements associated with one or more systems within a computing-based infrastructure;

receiving a plurality of monitoring elements, wherein the monitoring elements include attributes associated with functional status of the one or more systems;

assessing values of each of the attributes of the monitoring elements with a predefined threshold value to determine whether the one or more systems are operating in an expected manner;

generate a monitoring plan based on the plurality of monitoring objectives and the plurality of monitoring elements and based on the assessment of values of each of the attributes, wherein the generated monitoring plan is in the form of monitoring specification specifying a plurality of tags populated based on the plurality of monitoring objectives and the plurality of monitoring elements;

generating a monitoring solution based on the monitoring plan, monitoring objectives and the monitoring elements; and implementing the monitoring solution for the one or more systems by generating configurable settings for configuring at least one monitoring tool as specified by the monitoring solution.

\* \* \* \* \*